United States Patent
Suganuma

(10) Patent No.: US 6,704,748 B1
(45) Date of Patent: Mar. 9, 2004

(54) DATABASE SEARCH SYSTEM AND METHOD

(75) Inventor: Hiroshi Suganuma, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 159 days.

(21) Appl. No.: 09/651,675

(22) Filed: Aug. 30, 2000

(30) Foreign Application Priority Data

Sep. 3, 1999 (JP) ............................................ 11-249438

(51) Int. Cl.[7] .............................................. G06F 17/30
(52) U.S. Cl. ................................... 707/104.1; 707/100
(58) Field of Search .............................. 707/1, 2, 3, 4, 707/5, 6, 10, 100, 101, 102, 104.1

(56) References Cited

U.S. PATENT DOCUMENTS

| | | | | |
|---|---|---|---|---|
| 5,729,731 A | * | 3/1998 | Yajima et al. ................. | 707/10 |
| 5,761,529 A | * | 6/1998 | Raji et al. ....................... | 710/4 |
| 5,870,741 A | * | 2/1999 | Kawabe et al. ............. | 340/990 |
| 5,915,249 A | * | 6/1999 | Spencer ........................ | 707/10 |
| 5,930,799 A | * | 7/1999 | Tamano et al. .............. | 345/629 |
| 6,229,566 B1 | * | 5/2001 | Matsumoto et al. ...... | 348/231.2 |
| 6,300,949 B1 | * | 10/2001 | Shudo et al. ................ | 345/744 |

OTHER PUBLICATIONS

Sellis, T.K., Intelligent caching and indexing techniques for relational database systems, Information Systems, vol. 13, No. 2 (1988), pp. 175–185.3).*

* cited by examiner

*Primary Examiner*—Diane D. Mizrahi
(74) *Attorney, Agent, or Firm*—McGinn & Gibb, PLLC

(57) ABSTRACT

In order to make possible a variety of database searches, image data is registered on a first hard disk and a plurality of attribute tables each containing attribute information regarding images are registered on a second hard disk. When one search condition has been applied, a search of attribute information is conducted using one attribute table conforming to the search condition from among the attribute tables stored on the second hard disk. When another search condition has been applied, a search of attribute information is conducted using another attribute table stored on the second hard disk. Thus, a database can be searched even when search conditions differ.

15 Claims, 23 Drawing Sheets

*Fig. 4*

ATTRIBUTE TABLE 1
(DATE OF PHOTOGRAPHY)

| IDENTIFIER | DATE OF PHOTOGRAPHY | PLACE OF PHOTOGRAPHY |
|---|---|---|
| 1 | 12/29/1998 | NEW YORK CITY |
| 2 | 10/30/1999 | BOSTON |
| 3 | 12/11/2000 | BOSTON |
| 4 | 10/30/2000 | PHILADELPHIA |
|  |  |  |

*Fig. 5*

ATTRIBUTE TABLE 2
(SUBJECT)

| SUBJECT NAME | GENDER | AGE | BIRTHPLACE |
|---|---|---|---|
| SMITH, JOHN | MALE | 20 | NEW JERSEY |
| BROWN, MARY | FEMALE | 19 | VERMONT |
| SMITH, ROBERT | MALE | 19 | VERMONT |
| SMITH, RICHARD | MALE | 29 | VIRGINIA |
| DOE, WILLIAM | MALE | 56 | MAINE |
| JOHNSON, JANE | FEMALE | 26 | CALIFORNIA |
|  |  |  |  |

*Fig. 6*

IMAGE SEARCH TABLE

| SEARCH ITEM | IMAGE IDENTIFICATION NO. | NETWORK ADDRESS | SERVER NAME | HARD DISK NAME | IMAGE FILE ADDRESS |
|---|---|---|---|---|---|
| | 1 | NETAD10 | ...... | ...... | FILEAD1 |
| | 2 | NETAD10 | ...... | ...... | FILEAD2 |
| | 3 | NETAD10 | ...... | ...... | FILEAD1 |
| | 4 | NETAD10 | ...... | ...... | FILEAD2 |
| | 5 | NETAD10 | ...... | ...... | FILEAD3 |
| | 6 | NETAD10 | ...... | ...... | FILEAD4 |

Fig. 7

ATTRIBUTE SEARCH TABLE

| SEARCH ITEM | ATTRIBUTE TABLE IDENTIFICATION NO. | NETWORK ADDRESS | SERVER NAME | VENDER NAME | VERSION | OPERATING PRIVILEGE | HARD DISK NAME |
|---|---|---|---|---|---|---|---|
| | 1 | NETAD01 | ...... | ...... | ...... | ...... | ...... |
| | 2 | NETAD01 | ...... | ...... | ...... | ...... | ...... |

| DATABASE OWNER NAME | TABLE OWNER NAME | ATTRIBUTE TABLE NAME | ATTRIBUTE TABLE MAIN-KEY NAME | UTILIZING USER NAME | PASSWORD |
|---|---|---|---|---|---|
| ...... | ...... | ...... | ...... | ...... | ...... |
| ...... | ...... | ...... | ...... | ...... | ...... |

Fig. 8

BINDING TABLE 1

| IDENTIFIER (MAIN KEY) | BINDING INFORMATION |
|---|---|
| 1 | 0001 |
| 2 | 0010 |
| 3 | 0000 |
| 4 | 0000 |
| | |

*Fig. 9*

BINDING TABLE 2

| SUBJECT NAME (MAIN KEY) | BINDING INFORMATION |
|---|---|
| SMITH, JOHN | 000100 |
| BROWN, MARY | 001000 |
| SMITH, ROBERT | 010000 |
| SMITH, RICHARD | 100000 |
| DOE, WILLIAM | ...... |
| JOHNSON, JANE | ...... |
|  |  |

IMAGE IDENTIFICATION NO. 1

IMAGE IDENTIFICATION NO. 2

IMAGE IDENTIFICATION NO. 3
(SMITH, JOHN)

IMAGE IDENTIFICATION NO. 4
(BROWN, MARY)

IMAGE IDENTIFICATION NO. 5
(SMITH, ROBERT)

IMAGE IDENTIFICATION NO. 6
(SMITH, RICHARD)

IMAGE IDENTIFICATION NO. 7
(DOE, WILLIAM)

IMAGE IDENTIFICATION NO. 8
(JOHNSON, JANE)

DATABASE SEARCH SYSTEM AND METHOD

BACKGROUND OF THE INVENTION

1. Field of the Invention

This invention relates to a database search system and method.

2. Description of the Related Art

Image data representing a number of images is stored in an image database. By providing search conditions, image data representing an image that conforms to the search conditions is retrieved from the database and output. Attribute information regarding an image (incidental information such as date of photography of the image, place of photography and name of the photographer) also is associated with the image data. Depending upon the database, not only the image data but also the attribute information concerning this image data can be obtained.

In an image database from which attribute information is obtained in addition to image data, the image data and attribute information are stored in one-to-one correspondence in the same table within the same database. As a consequence, there are instances where a search is possible with regard to a certain prescribed search condition but is impossible in the case of another search condition. In such instances the database must be reconstructed from the beginning in order to make it possible to search the database under other search conditions as well.

DISCLOSURE OF THE INVENTION

An object of the present invention is to make possible various database searches in a system of a single type.

According to a first aspect of the present invention, the foregoing object is attained by providing a database search system comprising: an image database in which image data representing images is stored; an attribute information database in which there is stored an attribute information table for storing attribute information regarding image data, which has been stored in the image database, in association with search items; a link information database in which there is stored link information for linking attribute information that has been stored in the attribute information table and image data that has been stored in the image database; an attribute information search unit (attribute information search means) which, on the basis of a given search condition and link information that has been stored in the link information database, is for retrieving and outputting attribute information conforming to the search condition from the attribute information table that has been stored in the attribute information database; and an image data search unit (image data search means) which, on the basis of a given search condition and link information that has been stored in the link information database, is for retrieving and outputting image data that has been stored in the image database.

The first aspect of the present invention provides also a method suited for use in the system described above. Specifically, the method comprises the steps of: storing image data representing images in an image database; storing, in an attribute information database, an attribute information table for storing attribute information regarding image data, which has been stored in the image database, in association with search items; storing, in a link information database, link information for linking attribute information that has been stored in the attribute information table and image data that has been stored in the image database; on the basis of a given search condition and link information that has been stored in the link information database, retrieving and outputting attribute information conforming to the search condition from the attribute information table that has been stored in the attribute information database; and on the basis of a given search condition and link information that has been stored in the link information database, retrieving and outputting image data that has been stored in the image database.

Thus, in accordance with the first aspect of the present invention, the image data is stored in the image database, the attribute information table is stored in the attribute information database and the link information is stored in the link information database.

When a search condition is given, a search is conducted based upon the given search condition and the link information that has been stored in the link information database. Attribute information conforming to the given search condition is retrieved and output from the attribute information table that has been stored in the attribute information table. Further, a search is conducted based upon a search condition and the link information table, and image data that has been stored in the image database is retrieved and output.

The image database in which the image data is stored and the attribute information database in which the attribute information table is stored are separate databases (though they need not necessarily be physically separate and can be separate in logical terms). As a result, it is possible to revise the content of the attribute information table, add to the attribute information table and delete from the attribute information table independently of the image data. A database search that accommodates not only a certain specific search condition but also a variety of search conditions can be conducted.

A plurality of attribute information tables can be stored in the attribute information database. In such case an attribute information table that is to be searched would be searched for among the plurality of attribute information tables, which have been stored in the attribute information database, based upon a given condition and link information that has been stored in the link information database, and attribute information conforming to this search condition would be retrieved and output from the attribute information table that has been found.

Thus, an attribute information table to be searched is found among the plurality of attribute information tables in accordance with a given search condition and a search is conducted using the attribute information table found. This makes possible a database search for accommodating not only a certain specific search condition but also a variety of search conditions.

When an attribute information table conforming to a given search condition and that is to be searched has not been stored in the attribute information database, it will suffice to generate an attribute information table that can be searched in accordance with the given search condition and store this table in the attribute information database. This makes it possible to support searches in accordance with a variety of search conditions without reconstructing the attribute information table from scratch.

Link information that has been stored in the link information database includes first information for linking a given search condition and an attribute information table, and second information for linking a given search condition and image data, by way of example.

Identification codes for identifying the image data may be attached. In such case link data having a plurality of digits for linking the identification codes and the attribute information would be stored in the link information table. The link data and the identification codes would be associated with each other by the data of each digit of the link data.

An arrangement may be adopted in which the attribute information table is generated, it is determined whether the generated attribute information table has been stored in the attribute information database, and in response to a determination that the generated attribute information table has not been stored in the attribute information database, the generated attribute information table is stored in the attribute information database.

A new attribute information table can be stored in the attribute information database. Moreover, since it is determined whether the above-mentioned attribute information table has already been stored in the attribute information database, it will not duplicate an attribute information table that has already been stored in the attribute information database.

An arrangement may be adopted in which the link information that corresponds to the stored attribute information table is generated, responsive to storage of the generated attribute information table in the attribute information database, and the generated link information is stored in the link information database.

Thus, it becomes possible to link the attribute information contained in the attribute information table newly stored in the attribute information database and the image data that has been stored in the image database.

According to a second aspect of the present invention, the foregoing object is attained by providing a database search system comprising: an attribute information database in which there have been stored a plurality of attribute information tables for storing attribute information in association with search items; a link information database in which there is stored link information for specifying an attribute information table to be used in accordance with a given search condition from among the plurality of attribute information tables that have been stored in the attribute information database; and an attribute information search unit (attribute information search means) which, on the basis of a given search condition and link information that has been stored in the link information database, is for searching for an attribute information table to be searched among the plurality of attribute information tables that have been stored in the attribute information database, and retrieving and outputting attribute information conforming to the search condition from the attribute information table that has been found.

The second aspect of the present invention provides also a method suited for use in the system described above. Specifically, the method comprises the steps of: storing, in an attribute information database, a plurality of attribute information tables for storing attribute information in association with search items; storing, in a link information database, a plurality of items of link information for specifying an attribute information table to be used in accordance with a given search condition from among the plurality of attribute information tables that have been stored in the attribute information database; and, on the basis of a given search condition and link information that has been stored in the link information database, searching for an attribute information table to be searched among the plurality of attribute information tables that have been stored in the attribute information database, and retrieving and outputting attribute information conforming to the search condition from the attribute information table that has been found.

Thus, in accordance with the second aspect of the present invention, an attribute information table to be searched is found from among a plurality of attribute information tables in accordance with a given search condition, and a search is conducted using the attribute information table that has been found. A database search that accommodates not only a certain specific search condition but also a variety of search conditions can be conducted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4 and 5 illustrate attribute tables;

FIG. 6 illustrates an image search table;

FIG. 7 illustrates an attribute search table;

FIGS. 8 and 9 illustrate binding tables;

DESCRIPTION OF THE PREFERRED EMBODIMENT

A preferred embodiment of the present invention will now be described in detail with reference to the drawings.

Figure 1:
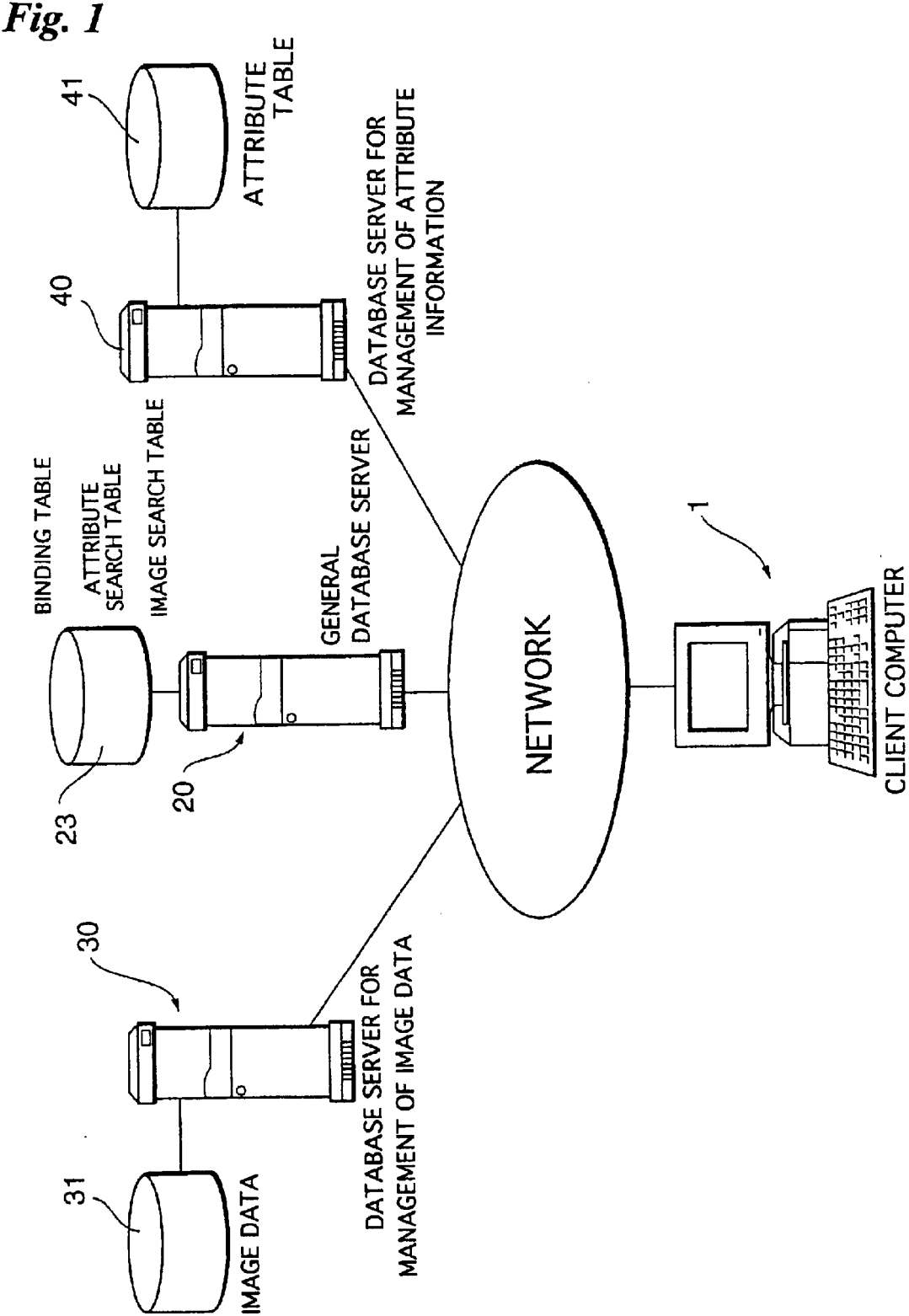
FIG. 1 illustrates the overall configuration of an image database system.

FIG. 1 illustrates an overview of an image database system according to a preferred embodiment of the present invention.

As shown in FIG. 1, the image database system comprises a client computer 1, a general database server 20, a database server 30 for management of image data and a database server 40 for management of attribute information.

The general database server 20, database server 30 for management of image data, database server 40 for management of attribute information and client computer 1 are capable of communicating data with one another via a network such as the Internet.

A hard disk (database) 23 is connected to the general database server 20. A binding table, attribute search table and image search table (described later) have been stored (registered) in the hard disk 23.

A hard disk 41 is connected to the database server 40 for management of attribute information. The hard disk 41 stores a plurality of attribute tables, described later. Though only one hard disk 41 is illustrated, it goes without saying that a plurality of hard disks can be used. Further, a plurality of the database servers 40 for management of attribute information can be used.

A hard disk 31 is connected also to the database server 30 for management of image data. This hard disk 31 stores image data, as will be described later. The database server 30 for management of image data also can employ a plurality of the hard disks. Further, it goes without saying that a plurality of the database servers 30 for management of image data can be used.

An overview of processing executed by the image database system according to this embodiment will now be described.

A search condition is entered from the client computer 1. Data representing the entered search condition is transmitted to the general database server 20 via the network. The attribute table that is the object of the search is searched for by the general database server 20 based upon the search condition. Using the attribute table that has been found by the search, the database server 40 for management of attribute information searches the attribute information that has been stored in this attribute table. The attribute information retrieved is transmitted to the general database server 20.

Image data that conforms to the search condition is searched for in the database server 30 for management of image data, and image data that has been found by the search is transmitted from the database server 30 for management of image data to the general database server 20.

The attribute information and the image data are transmitted to the client computer 1 by the general database server 20. The image represented by the image data and the attribute information are displayed on the display unit of the client computer 1.

The details of processing in the image database system will be described below.

Figure 2:
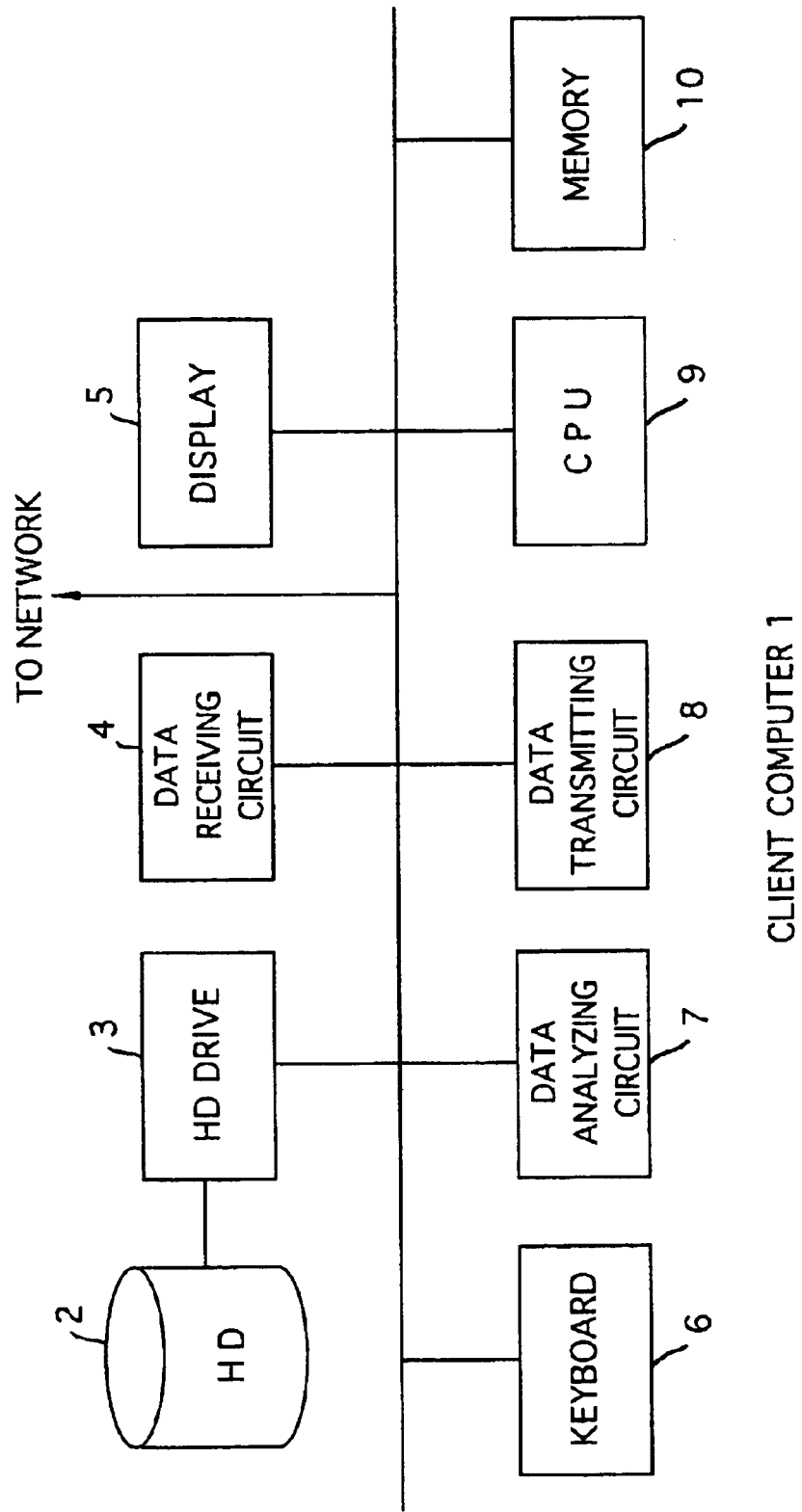
FIG. 2 is a block diagram illustrating the electrical construction of a client computer.

FIG. 2 is a block diagram illustrating the electrical construction of the client computer 1.

The overall operation of the client computer 1 is controlled by the CPU 9.

The client computer 1 includes a hard disk (HD) 2 for storing prescribed data; a hard-disk (HD) drive 3 for accessing the hard disk 2; a data receiving circuit 4 for receiving data transmitted via the network; a data transmitting circuit 8 for transmitting data via the network; a display unit 5 for displaying the image and attribute information in the manner described above; a keyboard 6 for entering search conditions and other commands; and a data analyzing circuit 7 for analyzing received data and other data. A memory 10 for temporarily storing data is connected to the client computer 1.

Figure 3:
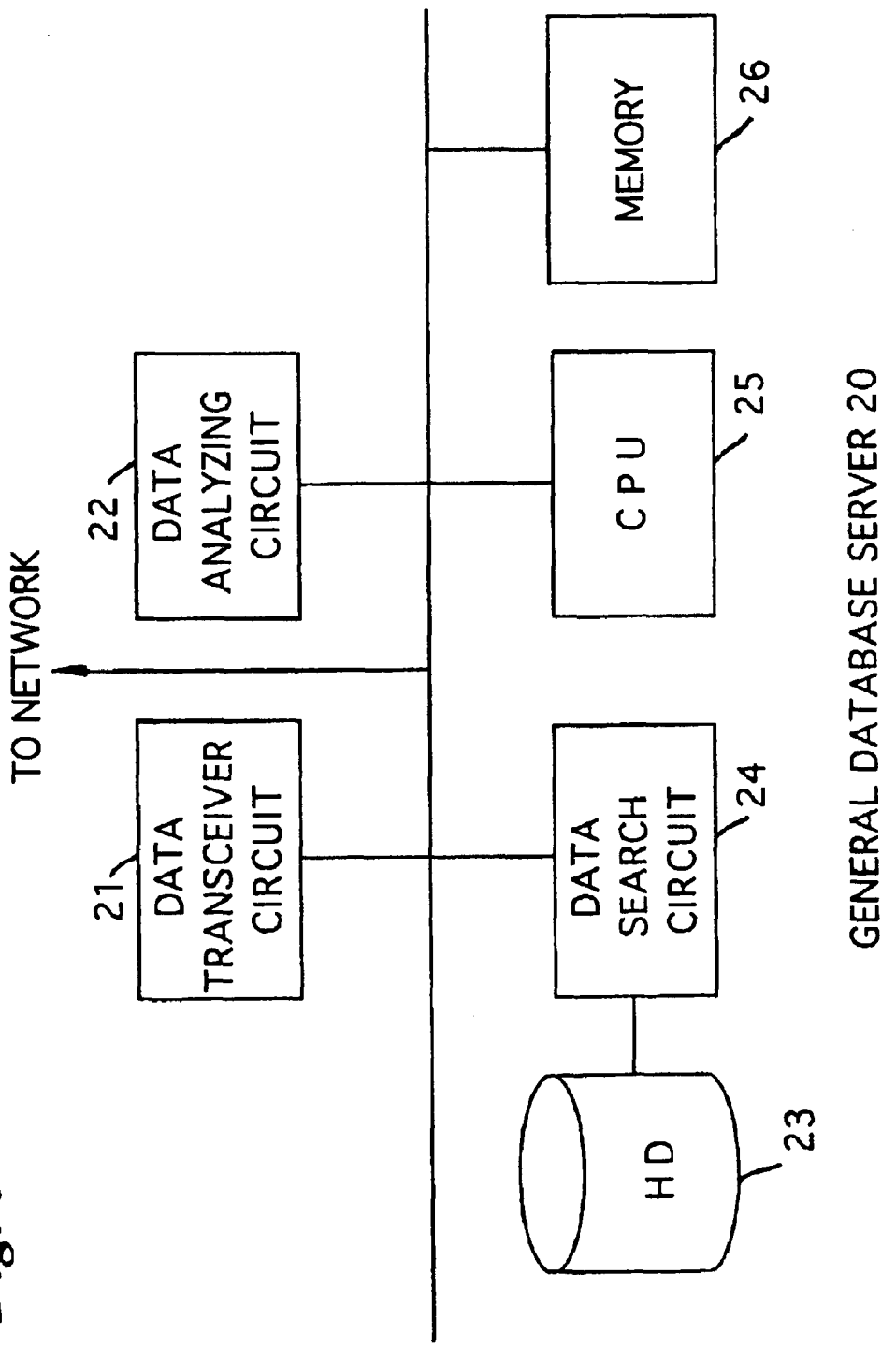
FIG. 3 is a block diagram illustrating the electrical construction of a general database server.

FIG. 3 is a block diagram illustrating the electrical construction of the general database server 20.

The overall operation of the general database server 20 is controlled by a CPU 25.

The general database server 20 includes a data transceiver circuit 21 for receiving data transmitted via the network and transmitting data via the network; a data analyzing circuit 22 for analyzing data; and a data search circuit 24 for searching data that has been stored in the hard disk 23. A memory 26 for temporarily storing data is connected to the general database server 20.

Like the general database server 20, the database server 40 for management of attribute information and the database server 30 for management of image data also each have a CPU, a data transceiver circuit, a data analyzing circuit, a data search circuit, a hard disk and a memory.

FIGS. 4 and 5 illustrate examples of attribute tables that have been stored on the hard disk 41 connected to the database server 40 for management of attribute information. The attribute tables store attribute information regarding images (namely information incidental to the images).

An Attribute Table 1 shown in FIG. 4 is an attribute table that concerns date of photography.

This attribute table includes identifiers, dates of photography (dates on which the images were captured) and places of photography (locations at which the images were captured) as search items.

An Attribute Table 2 shown in FIG. 5 is an attribute table that concerns subjects.

This attribute table includes the names of subjects, genders (genders of the subjects), ages (ages of the subjects) and birthplaces (birthplaces of the subjects) as search items.

FIG. 6 illustrates an example of an image search table that has been stored on the hard disk 23 connected to the general database server 20.

The image search table is a table utilized when searching image data that has been stored on the hard disk 31 connected to the database server 30 for management of image data.

Image identification numbers, network addresses, server names, hard disk names and image file addresses (these shall be referred to as search items) have been stored in the image search table in association with image data.

The image identification numbers are unique numbers for identifying images represented by image data that has been stored on the hard disk 31 connected to the database server 30 for management of image data.

The network addresses are addresses on the network to which the database server 30 for management of image data is connected.

The server names are the names of the image-data management database servers 30 specified by the network addresses.

The hard disk names are the names of the hard disks 31 which store image data.

The image file addresses are addresses indicating image-data storage locations on the hard disk 31 storing the image data.

FIG. 7 illustrates an example of an attribute search table that has been stored on the hard disk 23 connected to the general database server 20.

Attribute table identification numbers, network addresses, server names, vender names, versions, operating privilege, hard disk names, database owner names, attribute table names, attribute table main-key names, utilizing user names and passwords have been stored in the attribute search table on a per-attribute-table basis.

The attribute table identification numbers are unique numbers for identifying attribute tables that have been stored on the hard disk 41 connected to the database server 40 for management of attribute information.

The network addresses are addresses on the network to which the database server 40 for management of attribute information is connected.

The server names are the names of the attribute-information management database servers 40 which store the attribute tables.

The vender names indicate the names of the vendors of the attribute-information management database servers 40 which store the attribute tables.

The operating privilege indicates the names of users who have the privilege to operate (update, delete, etc.) the attribute tables.

The hard disk names are the names of the hard disks 41 which store the attribute tables.

The database owner names are the names of the users who manage the attribute tables. These names are identical with the above-mentioned names of the users having the operating privilege and the utilizing user names, described later. Of course, it goes without saying that the database owner names, the names of the users having the operating privilege and the utilizing user names may be different from one another.

The attribute table names are the names of the attribute tables.

The attribute table main-key names are names used as main keys in search conditions among search items when attribute information that has been stored in an attribute table is searched.

The utilizing user names are the names of users who are capable of utilizing the image database system according to this embodiment.

The passwords indicate the passwords of the individual users.

FIGS. 8 and 9 illustrate examples of binding tables that have been stored on the hard disk 23 connected to the general database server 20.

A binding table is a table for linking attribute tables and image data.

The binding table (Binding table No. 1) shown in FIG. 8 is a table for linking the attribute table shown in FIG. 4 and image data that has been stored on the hard disk 31 connected to the database server 30 for management of image data.

This binding table stores the identifiers, which are the main keys of the attribute table (the search items which specify the attribute tables in the search conditions) shown in FIG. 4, and binding information.

The binding table (Binding table No. 2) shown in FIG. 9 is a table for linking the attribute table shown in FIG. 5 and image data that has been stored on the hard disk 31 connected to the database server 30 for management of image data.

This binding table stores the names of subjects, which are the main keys of the attribute table shown in FIG. 5, and binding information.

The binding information is for linking the attribute information of the main key and image data to which this attribute information has been attached. The binding information is composed of data consisting of a plurality of digits. The plurality of digits correspond to image identification numbers that have been stored in the image search table.

By way of example, the least significant digit of the binding information corresponds to Image Identification No. 1 and the next least significant digit of the binding information corresponds to Image Identification No. 2. If binding information is "0", then the image specified by the corresponding image identification number is not one that concerns the corresponding attribute information. If binding information is "1", then the image specified by the corresponding image identification number is one that concerns the corresponding attribute information. Binding information does not necessarily contain only one "1" digit and may contain several "1" digits. This means that a plurality of images may be linked to attribute information by the binding information.

FIGS. 10a, and 10b and FIGS. 11a to 11f illustrate examples of images represented by image data that has been stored on the hard disk 31 connected to the database server 30 for management of image data.

Figure 10A:
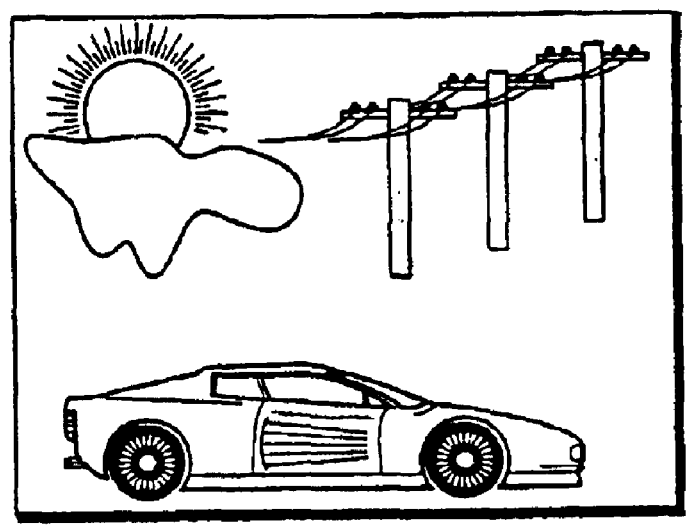
FIGS. 10a and 10b illustrate examples of images represented by image data that has been registered.
Figure 10B:
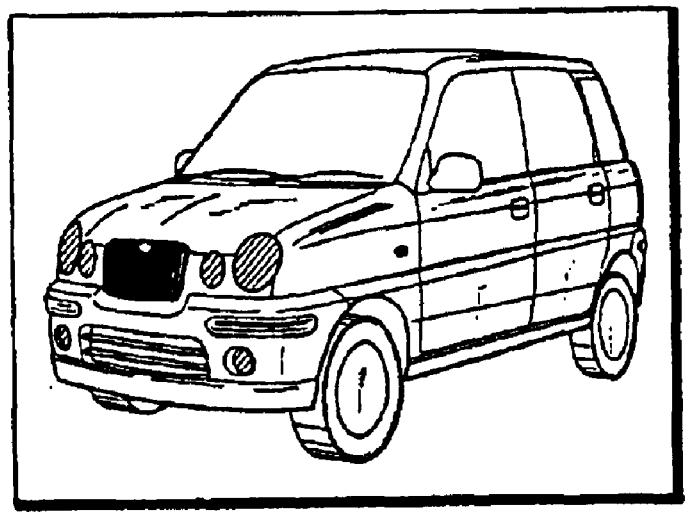
Figure 11A:
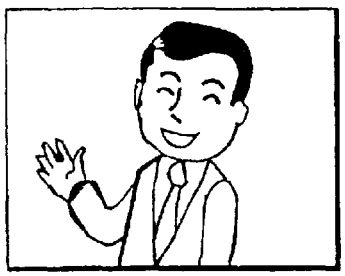
FIGS. 11a to 11f illustrate examples of images represented by image data that has been registered.
Figure 11B:
Figure 11C:
Figure 11D:
Figure 11E:
Figure 11F:
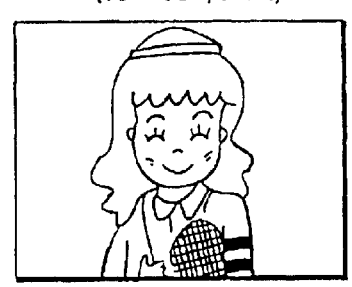

FIGS. 10a and 10b illustrate examples of images the attribute information of which has been stored in the attribute table illustrated in FIG. 4. By applying date of photography (or an identifier if desired) as the main key of the search condition, the image data is searched. Image Identification No. 1, described later, has been attached to the image illustrated in FIG. 10a, and Image Identification No. 2 has been attached to the image illustrated in FIG. 10b.

FIGS. 11a to 11f illustrate examples of images the attribute information of which has been stored in the attribute table depicted in FIG. 5. By applying the name of a subject as the main key of the search condition, the image data is searched. Image Identification Nos. 3 to 8 have been attached to the images illustrated in FIGS. 11a to 11f.

Figure 12:
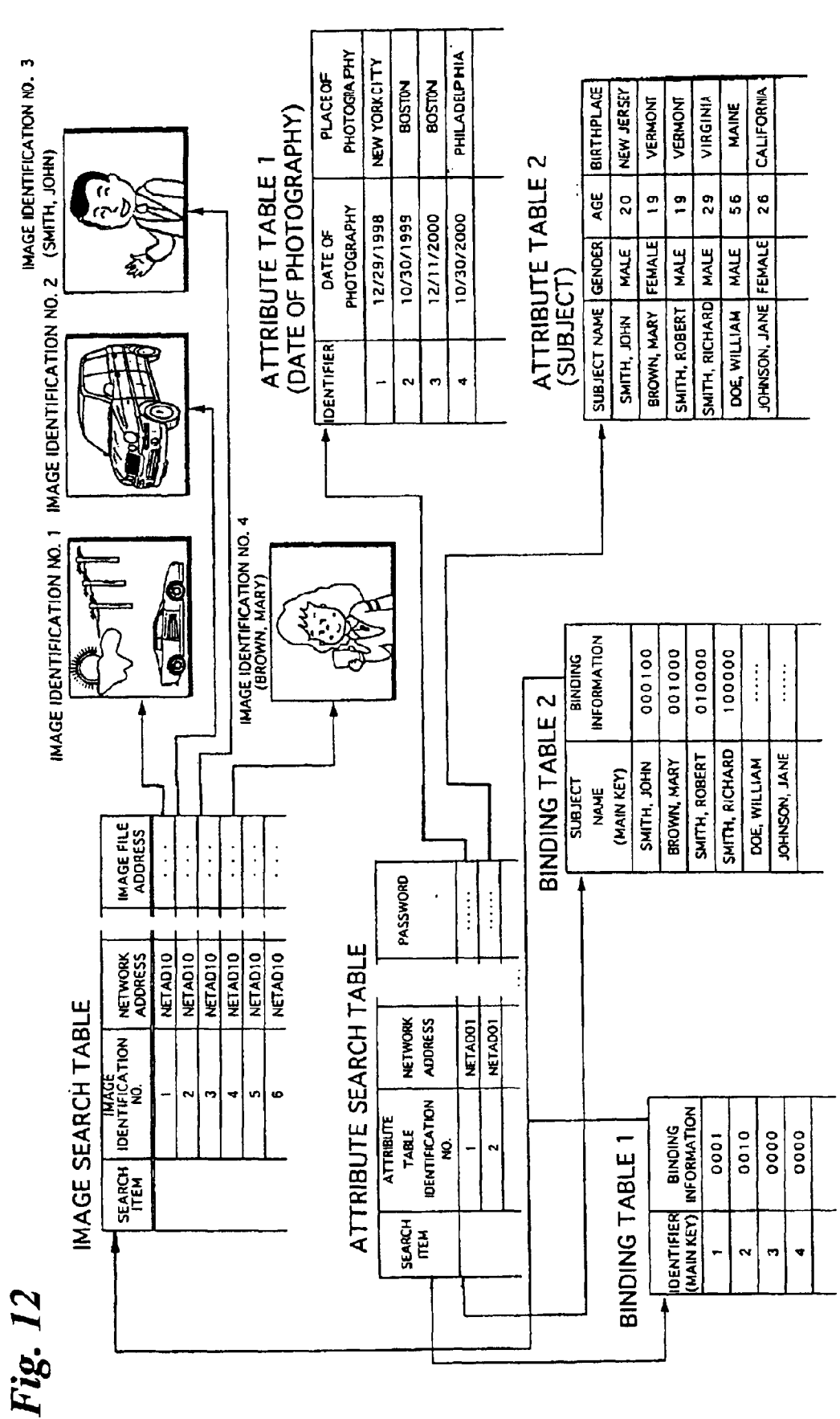
FIG. 12 illustrates the linkage between tables and image data.

FIG. 12 illustrates the linkage between the above-described attribute tables, image search table, attribute search table, binding tables and image data.

The attribute search table and the attribute tables are linked, the attribute search table and the binding tables are linked, the binding tables and the image search table are linked, and the image search table and image data are linked. The attribute tables (and the attribute information that has been stored in the attribute tables) and the image data can be searched.

FIGS. 13 to 16 are flowcharts illustrating search processing executed by the image database system according to this embodiment.

Figure 13:
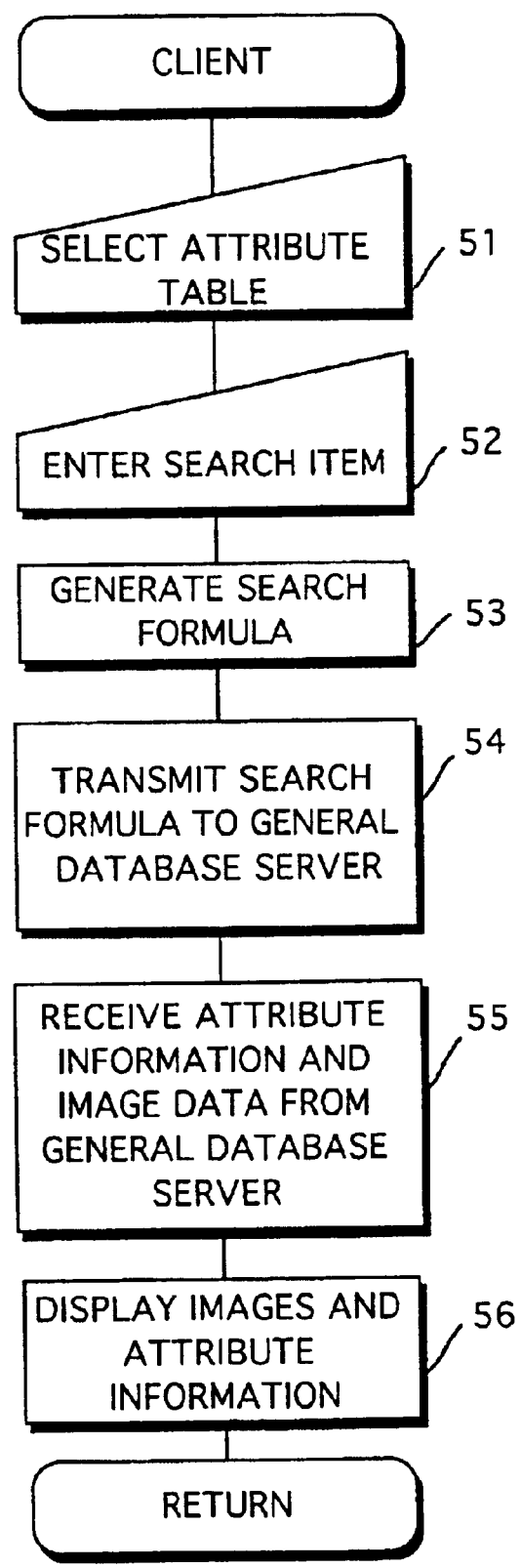
FIG. 13 is a flowchart illustrating processing executed by the client computer.
Figure 14:
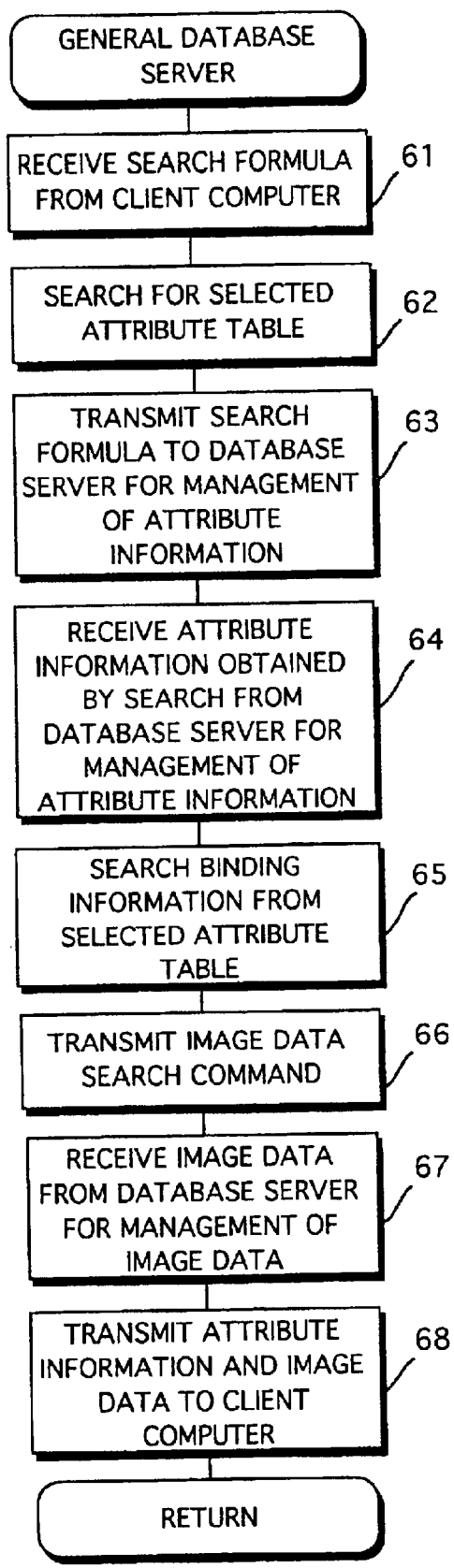
FIG. 14 is a flowchart illustrating processing executed by the general database server.
Figure 15:
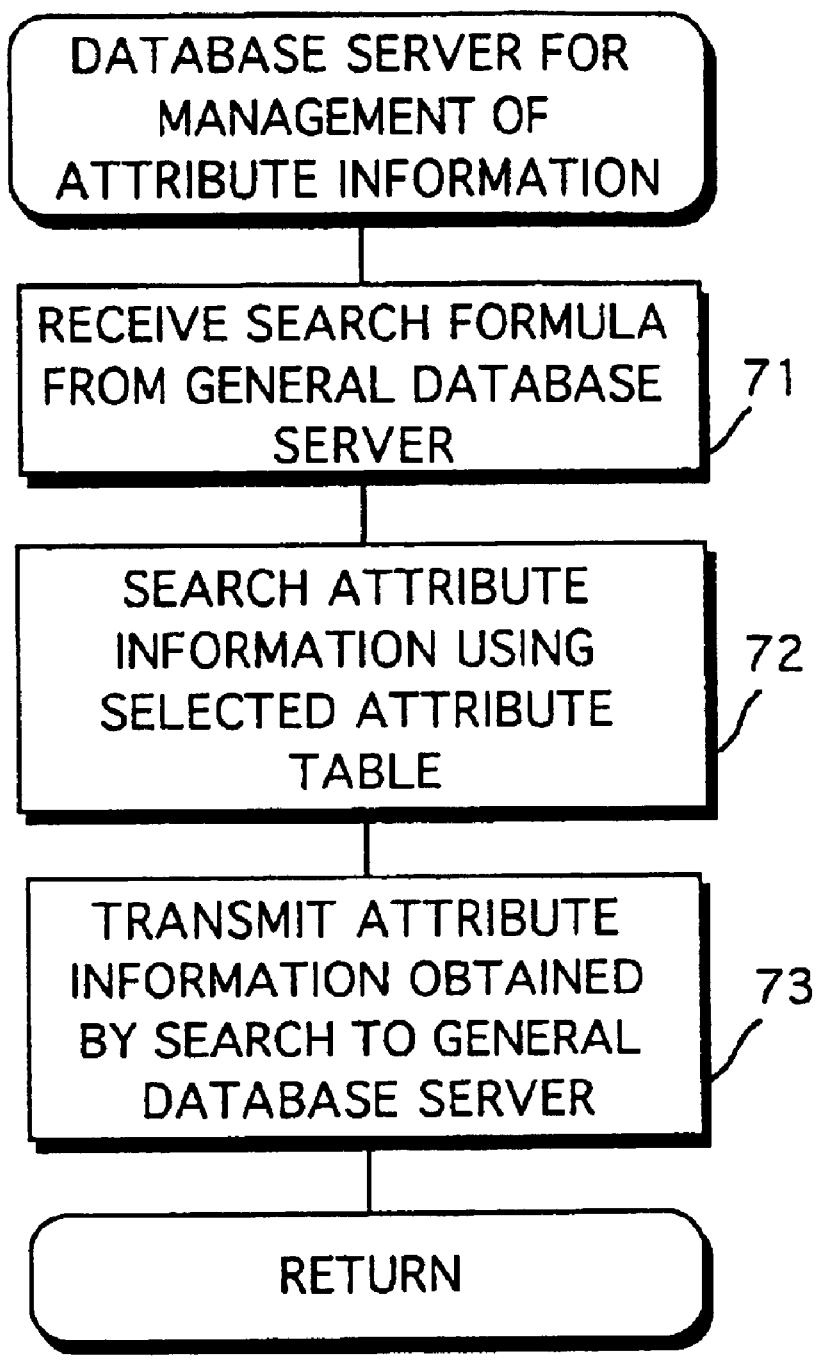
FIG. 15 is a flowchart illustrating processing executed by a database server for management of attribute information.
Figure 16:
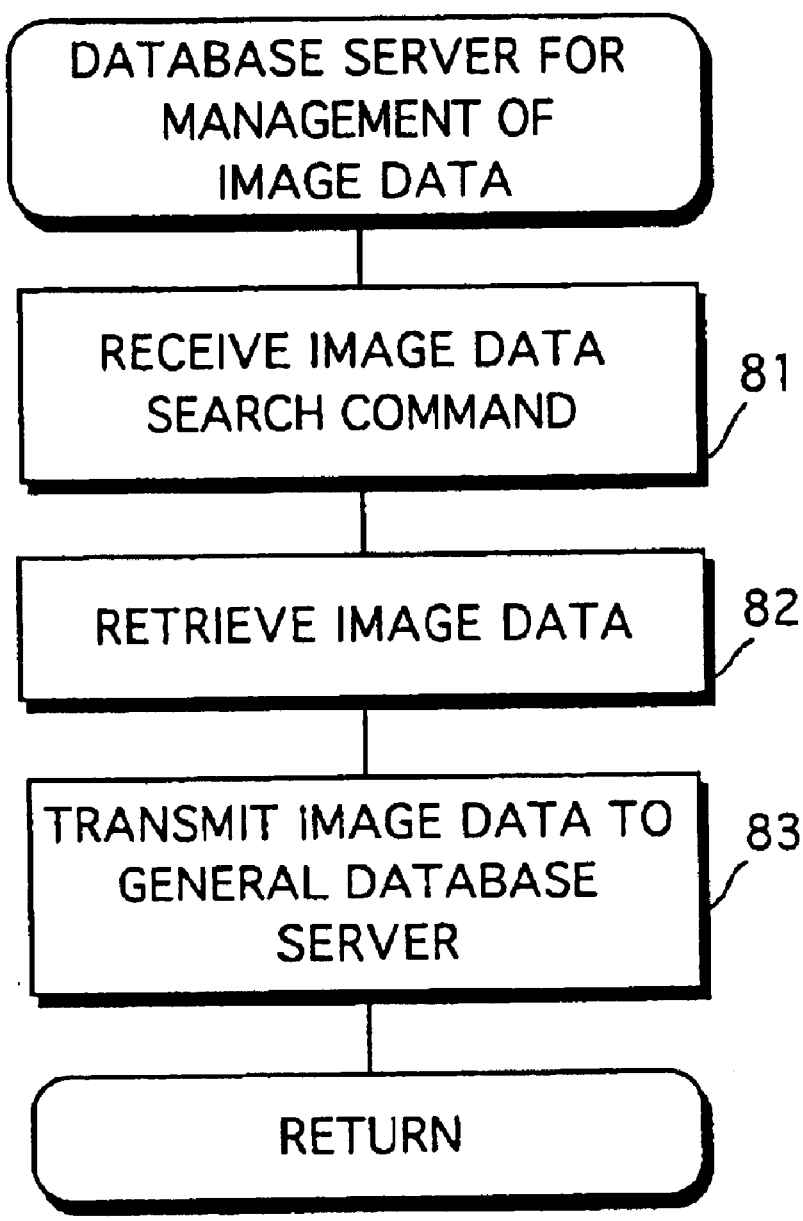
FIG. 16 is a flowchart illustrating processing executed by a database server for management of image data.

FIG. 13 is a flowchart illustrating processing executed by the client computer, FIG. 14 is a flowchart illustrating processing executed by the general database server 20, FIG. 15 is a flowchart illustrating processing executed by the database server 40 for management of attribute information, and FIG. 16 is a flowchart illustrating processing executed by the database server 30 for management of image data.

Using the client computer 1, the user selects the desired attribute table to be searched from among the plurality of attribute tables that have been stored on the hard disk 41 connected to the database server 40 for management of attribute information (step 51 in FIG. 13). It is assumed here that the user already knows what attribute tables have been stored on the hard disk 41. The user uses the keyboard 6 of the client computer 1 to enter a search condition in such a manner that the selected attribute table will become part of the search condition (step 52 in FIG. 13). For example, the user enters the search condition "RETRIEVE SUBJECT NAME AND BIRTHPLACE ATTRIBUTE INFORMATION FROM SUBJECT ATTRIBUTE TABLE WHERE SUBJECT NAME BEGINS WITH 'SMITH'".

When the search condition is entered from the keyboard 6 of the client computer 1, a search formula is generated by the CPU 9 (step 53 in FIG. 13). On the assumption that the search condition is the above-mentioned "RETRIEVE SUBJECT NAME AND BIRTHPLACE ATTRIBUTE INFORMATION FROM SUBJECT ATTRIBUTE TABLE WHERE SUBJECT NAME BEGINS WITH 'SMITH'", the formula generated is "SELECT SUBJECT, BIRTHPLACE FROM SUBJECT TABLE WHERE NAME=SMITH".

When the search formula is generated, data representing the formula is applied to the data transmitting circuit 8 of the client computer 1. The latter transmits the data representing the search formula to the general database server 20 via the network (step 54 in FIG. 13).

The data representing the search formula transmitted from the client computer 1 is received by the general database server 20 (step 61 in FIG. 14). On the basis of the received data representing the search formula, the general database server 20 searches for the attribute table that is the object of the search from the plurality of attribute tables that have been stored in the hard disk 41 connected to the database server 40 for management of attribute information (step 62 in FIG. 14). More specifically, in the case of the above-mentioned search formula, the name of the attribute table is "SUBJECT". Accordingly, the network address (NETAD2) of the attribute-information management database 40 that manages the hard disk 41 storing this attribute table is found from the attribute search table. The data representing the search formula is transmitted to the attribute-information management database 40 specified by the network address that has been found (step 63 in FIG. 14).

The database server 40 for management of attribute information receives the data representing the search formula transmitted from the general database server 20 (step 71 in FIG. 15). Upon receiving the data representing the search formula, the database server 40 for management of attribute information searches the attribute table, which has been selected from the attribute tables stored on the hard disk 41, for attribute information on the basis of the search formula (step 72 in FIG. 15). In the case of the above-mentioned search formula, the subject name having the name "SMITH" and the birthplace of this subject are found from the subject attribute table. The attribute information "SMITH, JOHN; NEW JERSEY", "SMITH, ROBERT; VERMONT" and "SMITH, RICHARD; TEXAS" is obtained from the attribute table shown in FIG. 5 by this search.

The data representing the attribute information obtained by the search of the attribute table is transmitted from the database server 40 for management of attribute information to the general database server 20 (step 73 in FIG. 15).

The data representing the attribute information transmitted from the database server 40 for management of attribute information is received by the general database server 20 (step 64 in FIG. 14).

Next, the general database server 20 finds the binding table to be utilized in the search of image data and searches the binding information contained in this binding table (step 65 in FIG. 14). Binding table numbers have been assigned to the binding tables and the binding table numbers correspond to the identification numbers of attribute tables. When the search formula is applied to the general database server 20 in the manner described above, the server refers to the attribute search table and ascertains the identification number of the attribute table from the name of the attribute table. Since this attribute table number corresponds to a binding table number, the binding table that corresponds to the search formula is found. Binding information corresponding to the attribute information obtained by searching the attribute table is retrieved from the binding information that has been stored in the binding table found (step 65 in FIG. 14).

In the search formula mentioned above, the attribute table selected is the subject attribute table and therefore the attribute search table number is "2". Accordingly, the binding table whose number is "2" is the binding table that should be utilized. The binding information "000100", "01000" and "100000" corresponding to the attribute information "SMITH, JOHN", "SMITH, ROBERT" and "SMITH, RICHARD", which was found by the search in the manner described above, is found by searching the binding information contained in the binding table that was found.

As mentioned earlier, the digits of the binding information and the image identification numbers correspond, and the image identification numbers are found from the image search table. For example, the binding information of the attribute information "SMITH, JOHN" is "000100", and the "1" digit is the third digit from the most significant digit. The image identification number, therefore, is "3". The network address and image file addresses corresponding to the found image identification numbers are read out of the image search table. The image-data management database server 30 managing the hard disk 31 storing the image data that is to be found is specified by the network address.

Further, the storage locations of the image data in the hard disk 31 connected to the specified database server 30 for management of image data are known from the image file addresses. These image file addresses are transmitted as an image data search command from the general database server 20 to the image-data management database server 30 specified by the network address (step 66 in FIG. 14).

The image data search command is received by the database server 30 for management of image data (step 81 in FIG. 16). Image data that has been stored at the locations designated by the image file addresses are read out of the hard disk 31 in accordance with the image data search command (step 82 in FIG. 16). The image data read out is transmitted from the database server 30 for management of image data to the general database server 20 (step 83 in FIG. 16).

The image data that has been transmitted from the database server 30 for management of image data is received by the general database server 20 (step 67 in FIG. 14).

The general database server 20 obtains the attribute information and image data conforming to the search formula and stores the same in memory temporarily. The data representing the attribute information and the image data obtained is read out of the memory and is transmitted from the general database server 20 to the client computer 1 via the network (step 68 in FIG. 14).

The client computer 1 receives the image data and the data representing the attribute information transmitted from the general database server 20 (step 55 in FIG. 13). The received image data and data representing the attribute information is applied to the display unit 5 of the client computer 1. As a result, the images represented by the image data and attribute information are displayed on the display screen of the display unit of client computer 1 (step 56).

In the embodiment described above, the images of subjects which begin with "SMITH" and the attribute information constituted by the names and birthplaces concerning these images are retrieved based upon the search condition "RETRIEVE SUBJECT NAME AND BIRTHPLACE ATTRIBUTE INFORMATION FROM SUBJECT ATTRIBUTE TABLE WHERE SUBJECT NAME BEGINS WITH 'SMITH'". However, other searches are also possible using the image database search system described above. For example, it is possible to conduct a search to obtain images that were shot over a certain specific period of time as well as the attribute information concerning these images, and images that were shot at a certain specific place as well as the attribute information concerning these images. It goes without saying that in a case where images that were shot over a certain specific period of time as well as the attribute information concerning these images and images that were shot at a certain specific place as well as the attribute information concerning these images are obtained by conducting a search, a "Date of Photography" attribute table and a binding table identified by Binding Table No. 1 would be used.

In the image database search system according to this embodiment, a plurality of attribute tables have been stored in the hard disk 41 connected to the database server 40 for management of attribute information. This means that various search conditions can be accommodated without reconstructing the database from scratch. In order to deal with a new search condition, the attribute table need only be stored on the hard disk 41.

Figure 17:
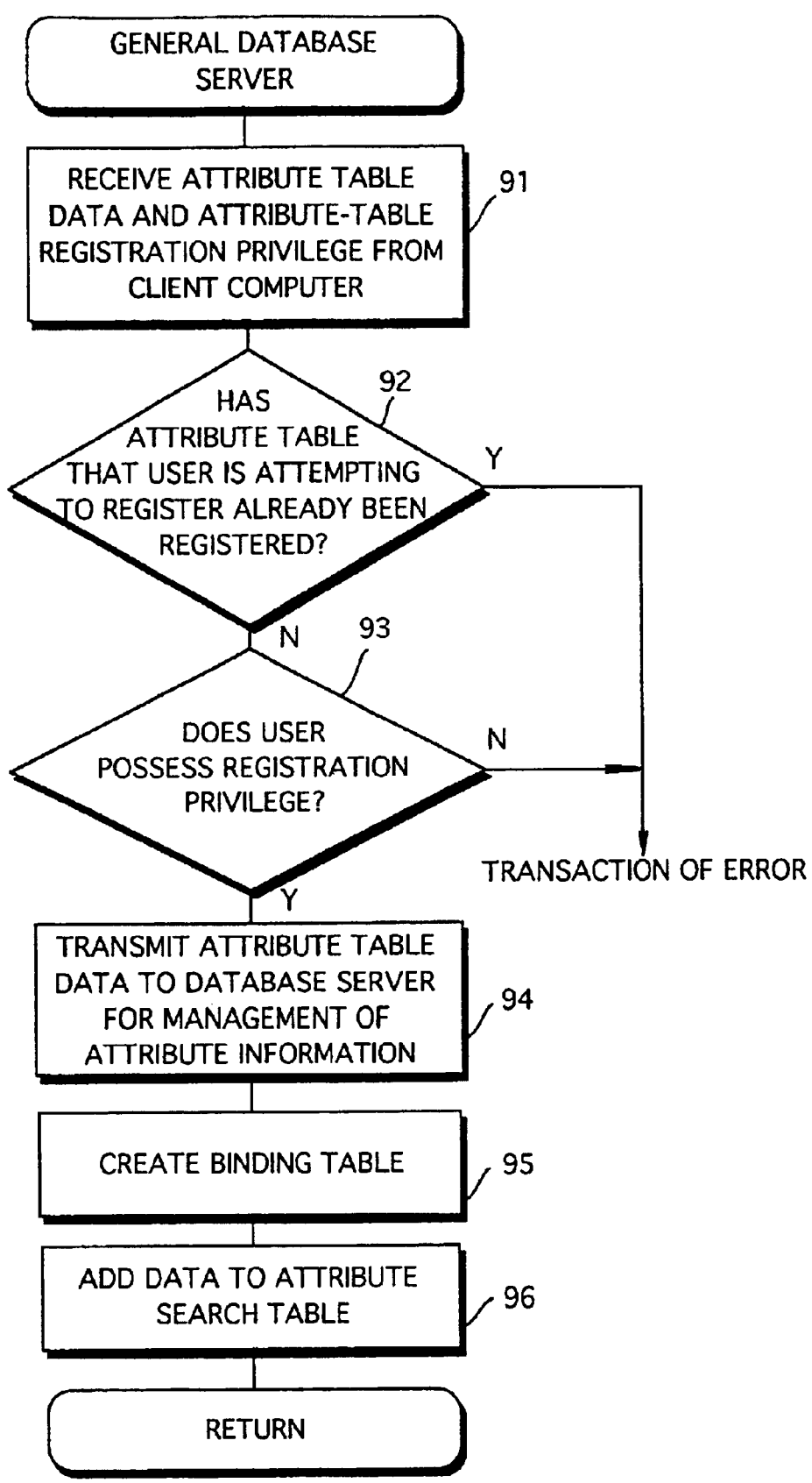
FIG. 17 is a flowchart illustrating processing executed by the general database server.
Figure 18:
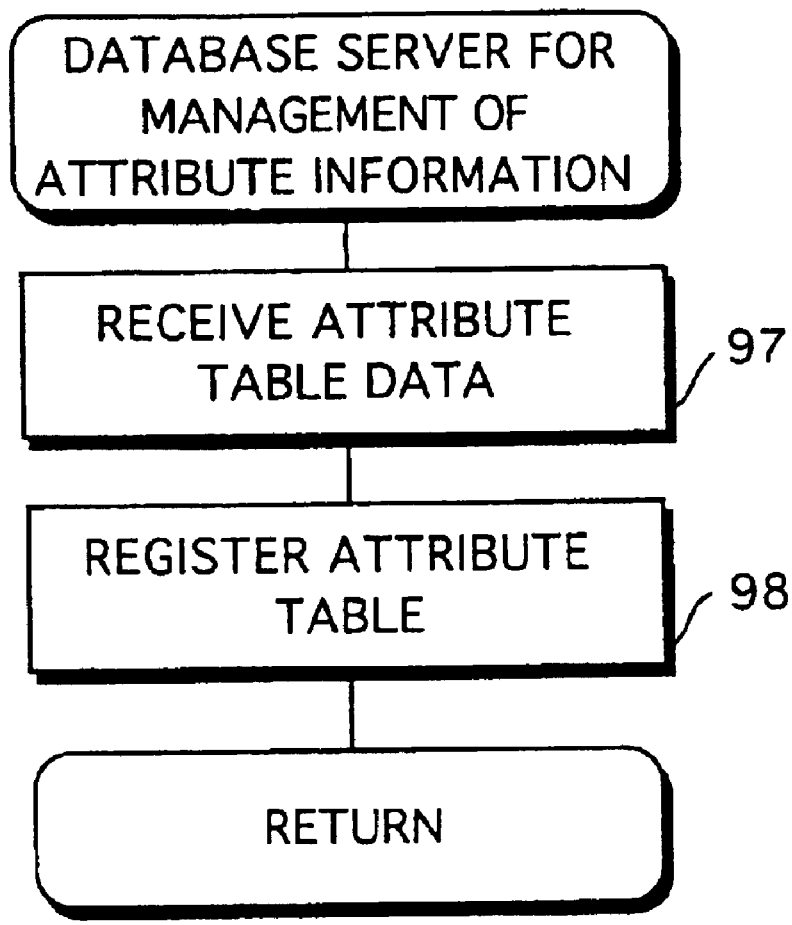
FIG. 18 is a flowchart illustrating processing executed by a database server for management of attribute information.

FIGS. 17 and 18 are flowcharts illustrating processing for storing a new attribute table on the hard disk 41 connected to the database server 40 for management of attribute information, in which FIG. 17 is a flowchart showing processing executed by the general database server and FIG. 18 a flowchart showing processing executed by the database server 40 for management of attribute information.

Figure 19:
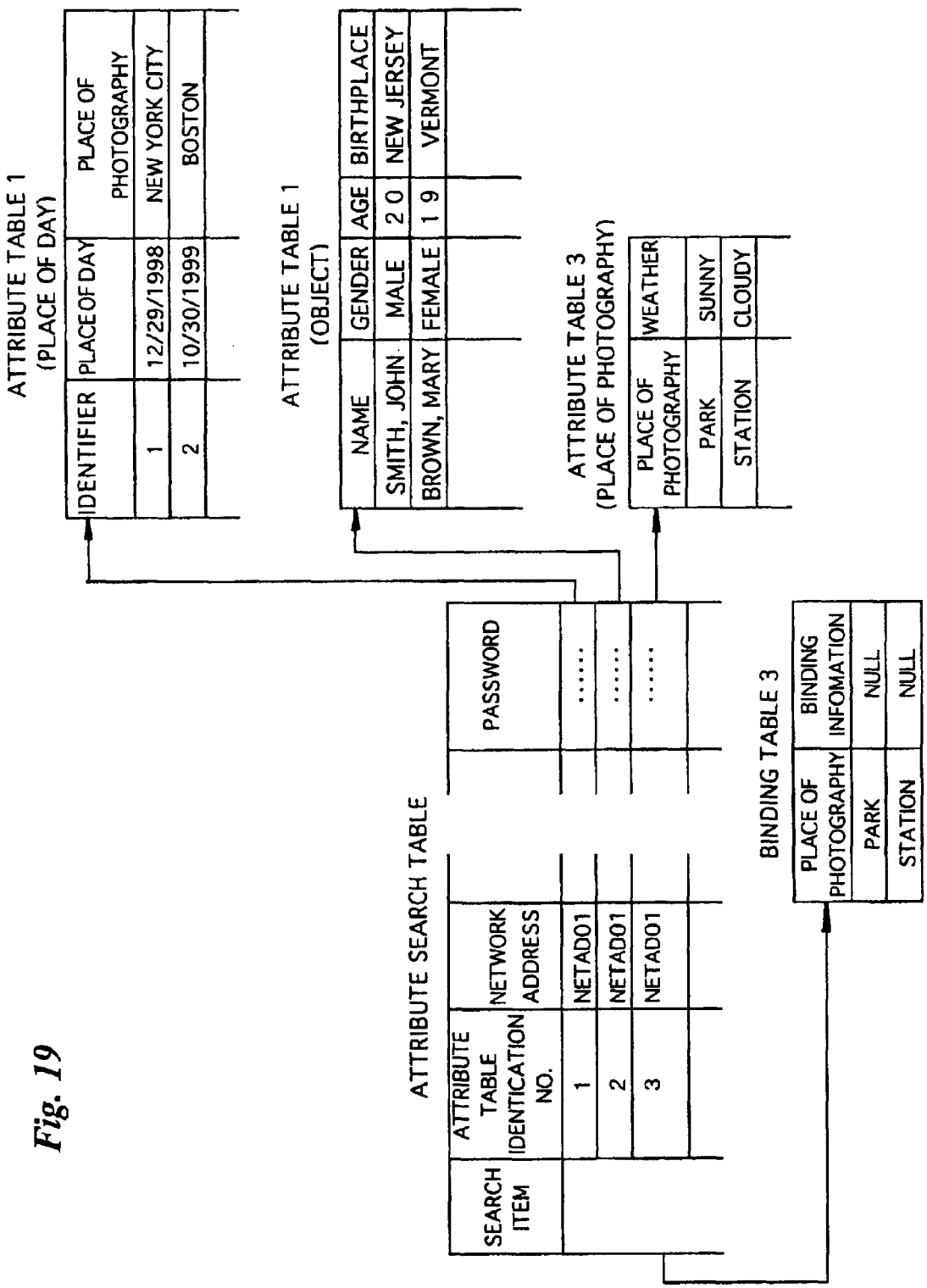
FIG. 19 illustrates linkage between tables.

FIG. 19 illustrates the linkage among attribute tables, an attribute search table and a binding table.

An attribute table to be stored on the hard disk 41 connected to the database server 40 for management of attribute information is input at the client computer 1. For example, an attribute table regarding place of photography (Attribute Table 3) is entered. Data representing the entered attribute table is transmitted from the client computer 1 to the general database server 20.

The attribute table data and data indicating attribute-table registration privilege is received by the general database server 20 (step 91 in FIG. 17). It is determined whether an attribute table having content identical with that of the attribute table about to be stored anew on the hard disk 41 already has been stored on the hard disk 41 (step 92 in FIG. 17). Further, it is determined whether the user of the client computer 1 has the privilege to register the attribute table (step 93 in FIG. 17). If the name of the user of the client computer 1 being accessed has been stored in the attribute search table, then it construed that this user has the registration privilege. It goes without saying that data representing the user name is transmitted from the client computer 1 to the general database server 20 in order to determine whether the user possesses the registration privilege.

If the attribute table that the user is attempting to register anew has not been stored on the hard disk 41 ("NO" at step 92 in FIG. 17) and the user of the client computer 1 possesses the privilege to register the attribute table ("YES" at step 93 in FIG. 17), then the received attribute table data is transmitted from the general database server 20 to the database server 40 for management of attribute information (step 94 in FIG. 17).

The database server 40 for management of attribute information receives the attribute table data transmitted from the general database server 20 (step 97) and then registers the received attribute table data in the hard disk 41 (step 98). Since a new attribute table is registered, it is possible to accommodate a different search.

The general database server 20 generates a binding table concerning the attribute table that has been newly registered on the hard disk 41 (step 95 in FIG. 17). For example, Binding Table 3 corresponding to the Attribute Table 3 concerning place of photography is generated.

When the new attribute table is generated, the binding table and the data of the attribute search table corresponding to the attribute table newly registered are added to the attribute search table (step 96). As a result, on the basis of the attribute information obtained by the search in the manner described above, the corresponding image data can be retrieved from the hard disk 31 connected to the database server 30 for management of image data.

When the attribute table that the user is attempting to register has already been registered on the hard disk 41 ("YES" at step 92 in FIG. 17), or when the user does not possess the privilege to register the attribute table ("NO" at step 93 in FIG. 17), predetermined error processing is executed.

Figure 20:
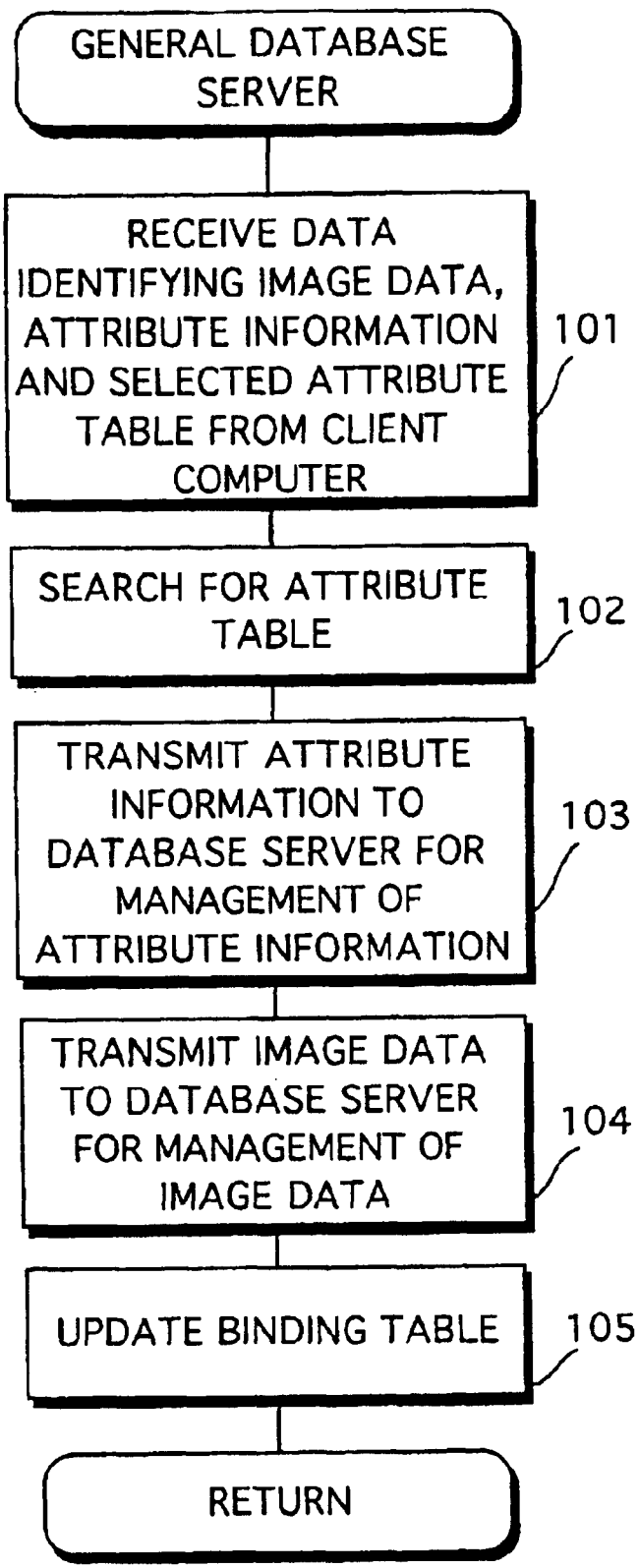
FIG. 20 is a flowchart illustrating processing executed by the general database server.
Figure 21:
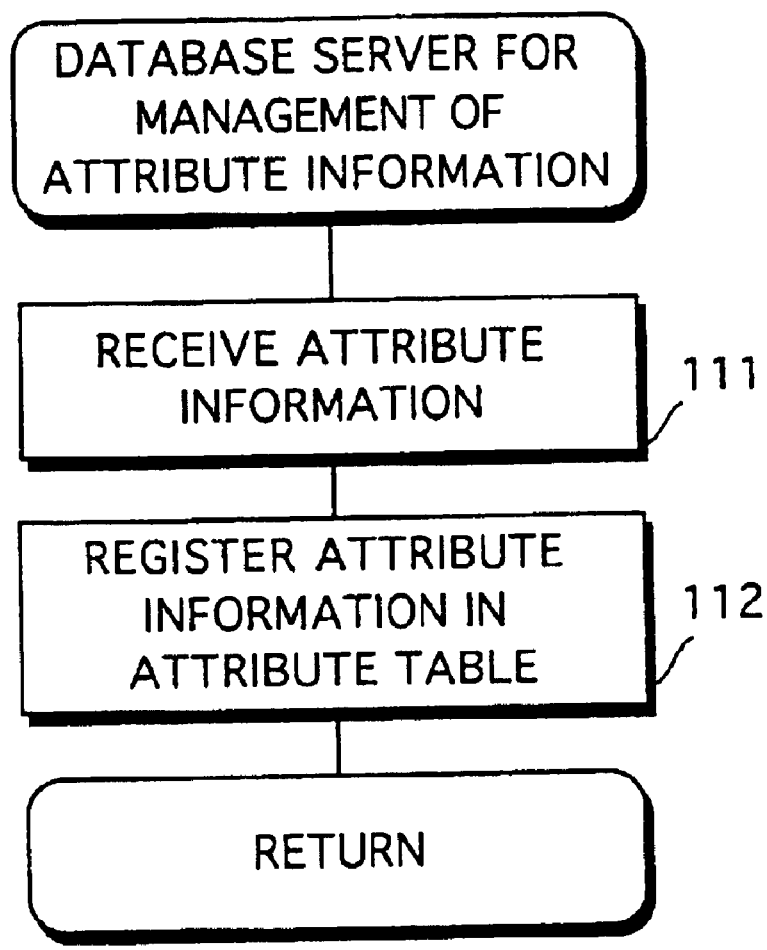
FIG. 21 is a flowchart illustrating processing executed by a database server for management of attribute information.
Figure 22:
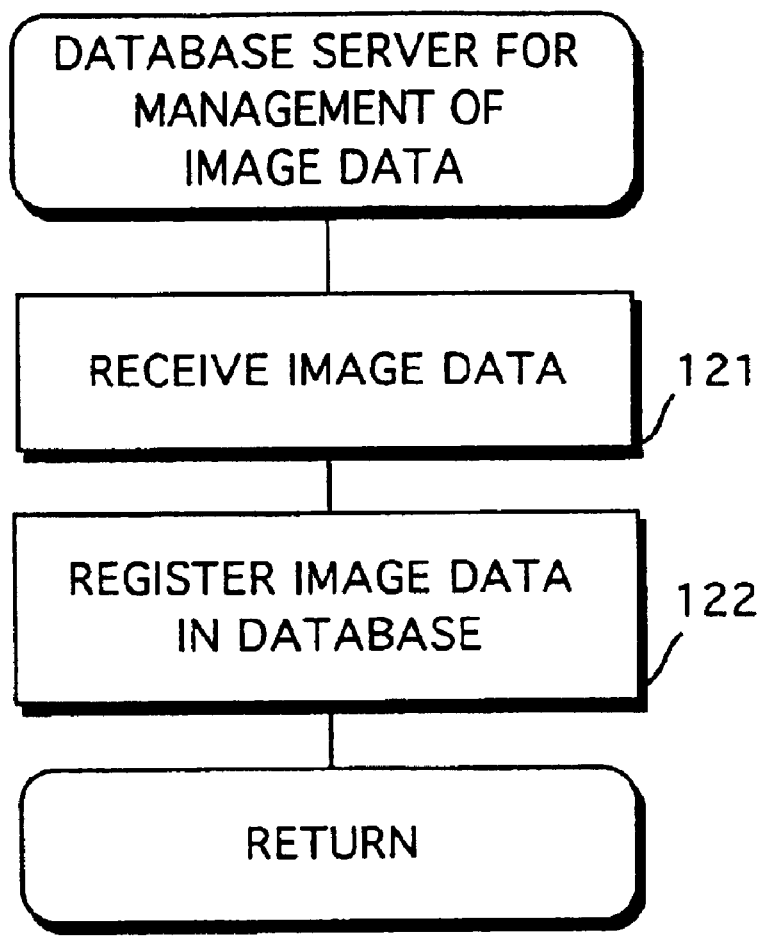
FIG. 22 is a flowchart illustrating processing executed by a database server for management of image data.

FIGS. 20 to 22 are flowcharts illustrating processing when image data and attribute information are registered.

FIG. 20 is a flowchart illustrating processing executed by the general database server 20, FIG. 21 is a flowchart illustrating processing executed by the database server 40 for management of attribute information and FIG. 22 is a flowchart illustrating processing executed by the database server 30 for management of image data.

Figure 23:
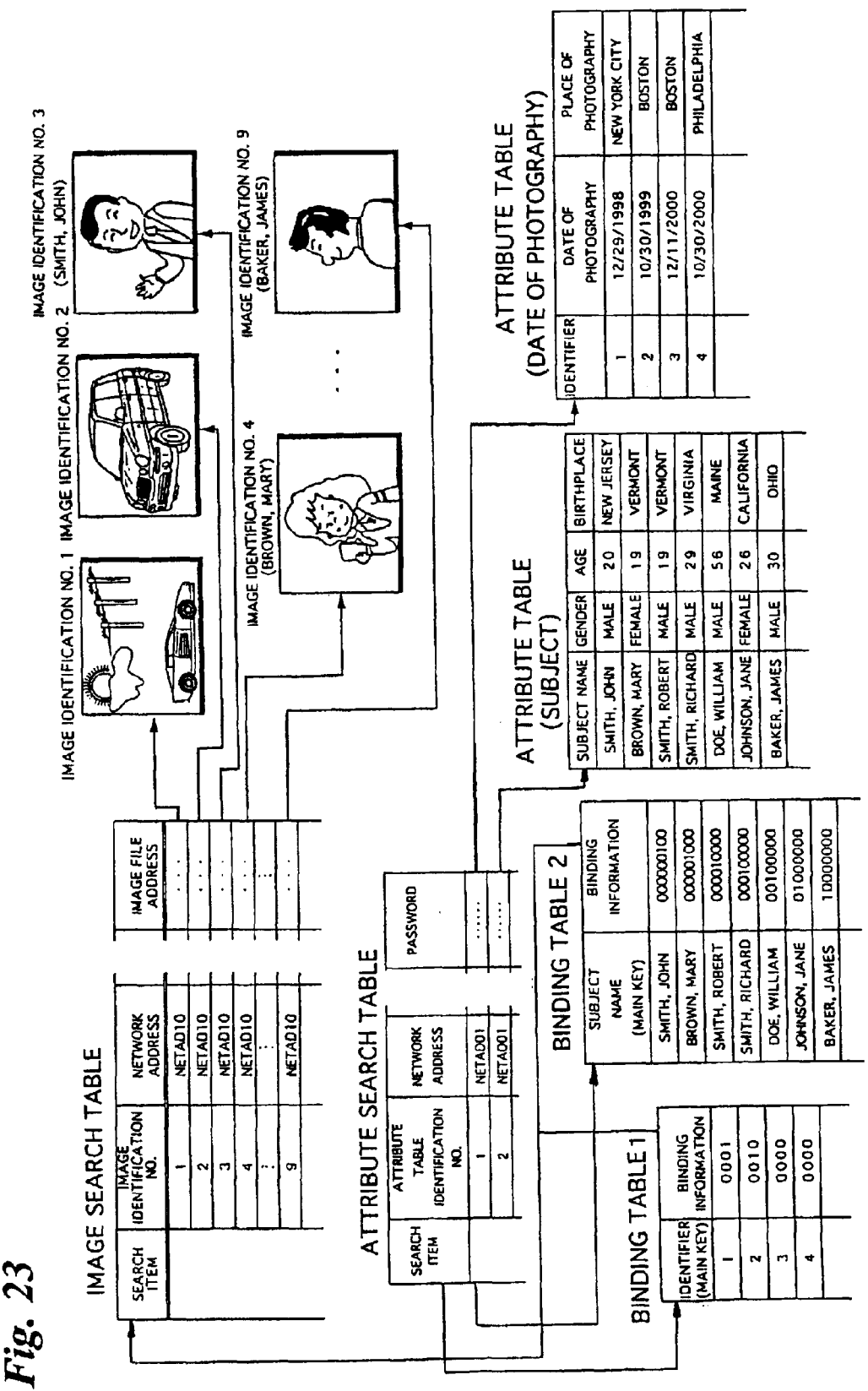
FIG. 23 illustrates the linkage between tables and image data.

FIG. 23 illustrates the linkage among attribute tables, an attribute search table, binding tables, an image search table and image data.

It is assumed here that attribute information, namely the subject name "BAKER, JAMES", gender "MALE", age "30" and birthplace "OHIO", and image data regarding this attribute information is to be registered.

The user of the client computer 1 enters the image data to be registered and the attribute information represented by this image data, and the user selects the attribute table in which the attribute information is to be registered. The entered image data and attribute information and data representing the selected attribute table are transmitted from the client computer 1 to the general database server 20.

The general database server 20 receives the image data, attribute information and data identifying the selected attribute table transmitted from the client computer 1 (step 101 in FIG. 20). On the basis of the data identifying the selected attribute table, the attribute table in which the attribute information is to be registered is searched for by referring to the attribute search table (step 102 in FIG. 20).

If the attribute table in which the attribute information is to be registered is found by the search, the attribute information that has been received is transmitted to the attribute-information management database 40 managing the hard disk on which this attribute table has been stored (step 103 in FIG. 20).

The attribute information that has been transmitted from the general database server 20 is received by the database server 40 for management of attribute information (step 111 in FIG. 21). The received attribute information is registered in the selected attribute table (step 112 in FIG. 21). As a result, the attribute information, namely the subject name "BAKER, JAMES", gender "MALE", age "30" and birthplace "OHIO", is registered in the subject attribute table.

Next, the image data is transmitted to the database server 30 for management of image data by the general database server 20 (step 104 in FIG. 20).

The database server 30 for management of image data receives the image data transmitted from the general database server 20 (step 121 in FIG. 22) and registers the received image data on the hard disk 31 (step 122 in FIG. 22). As a result, the image data is registered on the hard disk 31.

When the image data is registered on the hard disk 31, the binding table is updated (step 105). The image data that has been newly registered on the hard disk 31 can be searched using the binding table in the manner described above. For example, the subject name "BAKER, JAMES" and binding information "100000000" is registered in Binding Table 2.

As many apparently widely different embodiments of the present invention can be made without departing from the spirit and scope thereof, it is to be understood that the invention is not limited to the specific embodiments thereof except as defined in the appended claims.

What is claimed is:

1. A database search system, comprising:
    an image database that stores a plurality of images, each of said plurality of images having a unique image identifier;
    an attribute information database that stores a plurality of attribute information tables, each of said plurality of attribute information tables storing photography information as search items, said photography information corresponding to said plurality of images stored in said image database; and
    a link information database, comprising:
        a plurality of binding tables that store binding information for linking said photography information with said plurality of images, said binding information comprising an ordered string of bits, in which, a bit of said ordered string of bits corresponds to a value of said unique image identifier associated with one of said plurality of images;
        an attribute search unit that links a search condition to a selected attribute information table and said search items; and
        an image search unit that links said selected attribute information table and search items to a subset of said plurality of images.

2. The system according to claim 1, wherein on a basis of said search condition, said attribute information search unit selects said selected attribute information table, so that, said photography information, conforming to said search condition and said selected attribute information table, is retrieved from said attribute information database to said link database.

3. The system according to claim 1, wherein
    said attribute search unit includes an attribute search table that provides first link information, which links said search condition to said selected attribute information table, and
    said image search unit uses said search condition to provide second link information, which identifies one of said plurality of binding tables corresponding to said selected attribute information table, and said one of said plurality of binding tables links said photography information of said selected attribute information table to said plurality of images, so that, a subset of said plurality of images is retrieved from said image database to said link database.

4. The system according to claim 1, further comprising:
    an attribute information table generating unit for generating an additional attribute information table to be stored in said attribute information database;
    a determination unit for determining whether said additional attribute information table generated by said attribute information table generating unit is stored in said attribute information database; and
    a first storage control unit for storing said additional attribute information table generated by said attribute information table generating unit in said attribute information database, in response to a determination by said determination unit that said additional attribute information table is not stored in said attribute information database.

5. The system according to claim 4, further comprising:
    a link information generating unit, responsive to storage of said additional attribute information table in said attribute information database by said first storage control unit, in which said link information generating unit generates first link information, stored in said attribute search table, that corresponds to said additional attribute information table; and
    a second storage control unit for storing said second link information, generated by said link information generating unit that links said photography information of said additional attribute information table with said plurality of images stored in said image database.

6. A database search method, comprising:
    storing a plurality of images in an image database, each of said plurality of images having a unique image identifier;
    storing a plurality of attribute information tables in an attribute information database, each of said attribute information tables storing photography information as search items, said photography information corresponding to said plurality of images stored in said image database;
    storing a plurality of binding tables in a link information database, said plurality of binding tables including binding information, which comprises an ordered string of bits, in which, a bit of said ordered string of bits corresponds to a value of said unique image identifier associated with one of said plurality of images;
    linking a search condition to a selected attribute information table and said search items; and
    linking said selected search attribute information table and said search items to a corresponding subset of said plurality of images.

7. The system according to claim 1, wherein said image database, said attribute information database, and said link information database are connected to a network by a server.

8. The system according to claim 1, wherein said photography information comprises information concerning a photographed subject.

9. The system according to claim 1, wherein said image data is obtained by photography.

10. The system according to claim 1, wherein information stored in the attribute information data base comprises the photography information, which includes a photography date, a place of photography, and a subject name.

11. The system according to claim 1, wherein information stored in the attribute information data base comprises the photography information, which includes at least one of a photography date, a place of photography, and a subject name.

12. The system according to claim 6, wherein information stored in the attribute information data base comprises the photography information, which includes a photography date, a place of photography, and a subject name.

13. The system according to claim 6, wherein information stored in the attribute information data base comprises the photography information, which includes at least one of a photography date, a place of photography, and a subject name.

14. The system according to claim 1, wherein said bit comprises a single bit.

15. The system according to claim 6, wherein said bit comprises a single bit.

* * * * *